(12) United States Patent
Kimura et al.

(10) Patent No.: US 7,414,086 B2
(45) Date of Patent: Aug. 19, 2008

(54) ROOM TEMPERATURE-CURABLE ORGANOPOLYSILOXANE COMPOSITIONS

(75) Inventors: Tsuneo Kimura, Annaka (JP); Masaharu Sato, Annaka (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 54 days.

(21) Appl. No.: 11/409,041

(22) Filed: Apr. 24, 2006

(65) Prior Publication Data

US 2006/0258818 A1 Nov. 16, 2006

(30) Foreign Application Priority Data

May 13, 2005 (JP) ............... 2005-141156

(51) Int. Cl.
*C08K 3/36* (2006.01)

(52) U.S. Cl. ............ 524/493; 524/731; 524/492; 524/588; 524/268; 528/34

(58) Field of Classification Search ............. 524/731, 524/492, 493, 588, 268; 528/34
See application file for complete search history.

(56) References Cited

U.S. PATENT DOCUMENTS

| 4,261,758 A | 4/1981 | Wright et al. | |
|---|---|---|---|
| 4,304,897 A | 12/1981 | Bluestein | |
| 4,618,646 A | 10/1986 | Takago et al. | |
| 5,561,184 A * | 10/1996 | Miyoshi et al. | 524/425 |
| 5,958,116 A * | 9/1999 | Kishihara et al. | 106/15.05 |
| 6,451,437 B1 * | 9/2002 | Amidaiji et al. | 428/447 |
| 6,593,413 B2 * | 7/2003 | Muramatsu et al. | 524/493 |
| 2004/0082736 A1 * | 4/2004 | Sakamoto et al. | 525/477 |

FOREIGN PATENT DOCUMENTS

| JP | 61-21158 | 1/1986 |
|---|---|---|
| JP | 62-135560 | 6/1987 |
| JP | 1-245057 | 9/1989 |
| JP | 2-48586 | 10/1990 |

OTHER PUBLICATIONS

U.S. Appl. No. 08/305,164, filed Sep. 13, 1994, Arai et al.
U.S. Appl. No. 07/851,246, filed Mar. 13, 1992, Arai et al.

* cited by examiner

*Primary Examiner*—Margaret G Moore
(74) *Attorney, Agent, or Firm*—Oblon, Spivak, McClelland, Maier & Neustadt, P.C.

(57) ABSTRACT

RTV organopolysiloxane compositions comprising (A) a diorganopolysiloxane having hydroxyl or alkoxysilyl groups at both ends, (B) a polyoxypropylene-modified silicone, (C) wet silica, and (D) a silane or siloxane having at least three silicon-bonded hydrolyzable groups have improved sag control and cure at room temperature into products with improved rubber physical properties and durability.

10 Claims, No Drawings

ROOM TEMPERATURE-CURABLE ORGANOPOLYSILOXANE COMPOSITIONS

CROSS-REFERENCE TO RELATED APPLICATION

This non-provisional application claims priority under 35 U.S.C. §119(a) on Patent Application No. 2005-141156 filed in Japan on May 13, 2005, the entire contents of which are hereby incorporated by reference.

TECHNICAL FIELD

This invention relates to room temperature-curable organopolysiloxane compositions which have improved non-sag property and cure at room temperature to achieve improved rubber physical properties and durability so that they are suited for use as silicone-based sealing agents and adhesives. It is noted that the term "room temperature-curable" is often referred to as RTV as it is synonymous with room temperature-vulcanizable.

BACKGROUND ART

In various buildings, concrete-sash joints and peripheries of glazing are generally sealed by applying or filling with sealing materials such as synthetic rubber or the like. Known sealing materials include materials based on silicone, polysulfide, modified silicone, polyurethane, acrylic rubber, SBR, butyl rubber and the like. Due to adhesion, heat resistance and weather resistance, silicone-based sealing materials of the condensation cure type are widely used. The basic properties required for such silicone-based sealing materials are non-sag property and fatigue endurance as well as weather resistance.

It is known that the use of sag control agents such as polyethers and the type of filler largely contribute to the non-sag property. In general-purpose silicone sealing materials currently used in the art, treated dry silica and surface treated colloidal calcium carbonate are predominant fillers. With regard to combinations of fillers with sag-control agents, U.S. Pat. No. 4,261,758 or JP-B 2-48586 disclose a combination of dry silica and a polyether with a molecular weight of 300-100,000. U.S. Pat. No. 4,304,897 or JP-A 1-245057 describes a combination of dry silica whose surface has been pretreated with octamethylcyclotetrasiloxane and a copolymer of polysiloxane and polyether which are linked through carboxyl groups. JP-A 61-21158 discloses a combination of a polyether having hydrolyzable silyl groups at both ends and a filler. JP-A 62-135560 discloses a combination of a polypropylene glycol having ketoxime groups at both ends and fumed silica. There remains a desire to have RTV organopolysiloxane compositions having further improved non-sag property.

DISCLOSURE OF THE INVENTION

An object of the invention is to provide room temperature-curable organopolysiloxane compositions which have improved non-sag property and cure at room temperature to achieve improved rubber physical properties.

Wet silica is one of the fillers commonly used in silicone rubber compositions. However, wet silica is not used in silicone rubber compositions of the condensation cure type because it is difficult to impart non-sag property. Making investigations to impart non-sag property to RTV organopolysiloxane compositions of the condensation cure type loaded with wet silica and used as silicone sealants, the inventors have found that a specific polyether-modified silicone, that is, polyoxypropylene-modified silicone is effective in imparting non-sag property.

In one aspect, the present invention provides a room temperature-curable organopolysiloxane composition comprising
(A) 100 parts by weight of a diorganopolysiloxane having hydroxyl groups at both ends and/or a diorganopolysiloxane having alkoxysilyl groups at both ends,
(B) 0.1 to 10 parts by weight of a polyoxypropylene-modified silicone,
(C) 1 to 50 parts by weight of wet silica, and
(D) 1 to 20 parts by weight of a silane or siloxane having at least three hydrolyzable groups bonded to silicon atoms in a molecule.

Preferably, the polyoxypropylene-modified silicone (B) has the general formula (1), (2) or (3).

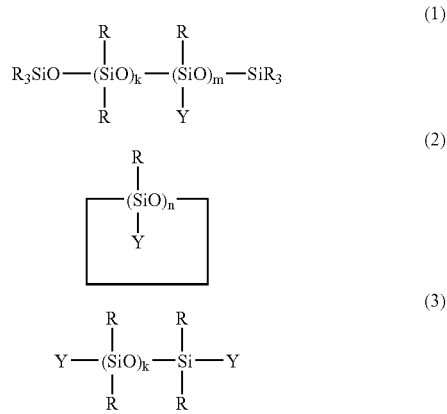

Herein R is each independently a substituted or unsubstituted monovalent hydrocarbon group, Y is $-R^1-O-(C_3H_6O)_j-H$, $R^1$ is an alkylene group of 1 to 12 carbon atoms, k is an integer of at least 1, m is an integer of at least 1, k+m is an integer of at least 10, n is an integer of at least 4, and j is an integer of at least 5.

The wet silica (C) should preferably have a water content of up to 1% by weight. In a preferred embodiment, the composition may further comprise (E) 0.01 to 10 parts by weight of a cure catalyst and/or (F) 0.1 to 20 parts by weight of a silane coupling agent. The composition is typically used as a sealing agent or adhesive.

BENEFITS OF THE INVENTION

The RTV organopolysiloxane compositions of the invention have improved non-sag property and cure at room temperature into products with improved rubber physical properties and durability.

DESCRIPTION OF THE PREFERRED EMBODIMENTS

Component A

In the RTV organopolysiloxane composition of the invention, component (A) is a diorganopolysiloxane having hydroxyl groups at both ends and/or a diorganopolysiloxane having alkoxysilyl groups at both ends. It is used as a base polymer in the inventive composition. A typical choice may be made of diorganopolysiloxanes having the general formulae (4) and (5).

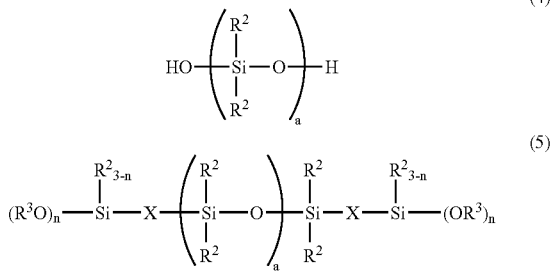

Herein, $R^2$ which may be the same or different is a substituted or unsubstituted monovalent hydrocarbon group of 1 to 10 carbon atoms, $R^3$ which may be the same or different is a substituted or unsubstituted monovalent hydrocarbon group of 1 to 6 carbon atoms, X is an oxygen atom or a substituted or unsubstituted divalent hydrocarbon group of 2 to 6 carbon atoms, a is an integer of at least 10, and n is an integer of 1 to 3.

Specifically, $R^2$ is at each occurrence selected from monovalent hydrocarbon groups of 1 to 10 carbon atoms, preferably 1 to 8 carbon atoms, for example, alkyl groups such as methyl, ethyl, propyl, isopropyl and hexyl, cycloalkyl groups such as cyclohexyl, alkenyl groups such as vinyl, allyl and propenyl, and aryl groups such as phenyl, and substituted forms of the foregoing monovalent hydrocarbon groups in which some or all hydrogen atoms are substituted by halogen atoms or the like, such as chloromethyl and 3,3,3-trifluoropropyl.

$R^3$ is at each occurrence selected from monovalent hydrocarbon groups of 1 to 6 carbon atoms, for example, alkyl groups such as methyl, ethyl, propyl and isopropyl, and alkenyl groups such as isopropenyl, and substituted forms of the foregoing monovalent hydrocarbon groups in which some or all hydrogen atoms are substituted by halogen atoms or the like, such as chloromethyl and 3,3,3-trifluoropropyl. For reactivity, methyl and ethyl are preferred.

X is an oxygen atom or a divalent hydrocarbon group of 2 to 6 carbon atoms, such as ethylene, propylene, butylene and 2-methylpropylene, or substituted forms of the foregoing divalent hydrocarbon groups in which some or all hydrogen atoms are substituted by halogen atoms or the like.

The subscript n is an integer of 1 to 3, and preferably 2 or 3.

The subscript a is an integer of greater than or equal to 10, and preferably such that the diorganopolysiloxane may have a viscosity of 100 to 1,000,000 mPa-s, more preferably 500 to 200,000 mPa-s at 20° C. It is noted that the viscosity is measured by a rotational viscometer at 20° C.

These polymers are well known in the art. The polymers having formula (4) may be prepared through equilibration of corresponding cyclic siloxanes in the presence of water. The polymers having formula (5) wherein X is an oxygen atom may be prepared through condensation reaction of polymers of formula (4) with corresponding alkoxysilanes. The polymers having formula (5) wherein X is a divalent hydrocarbon group may be prepared through addition reaction of a corresponding alkenyl end-stopped organopolysiloxane and a silane having alkoxy and Si—H groups, or addition reaction of an Si—H end-stopped organopolysiloxane and a silane having alkoxy and alkenoxy groups, in the presence of transition metal catalysts such as platinum catalysts.

Component B

Component (B) is a polyoxypropylene-modified silicone, preferably one having the general formula (1), (2) or (3).

It serves as a sag-control agent in the inventive composition.

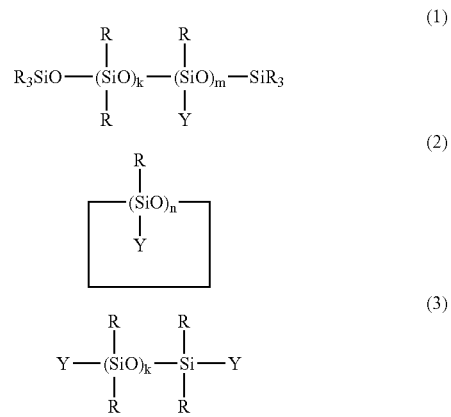

Herein R is each independently a substituted or unsubstituted monovalent hydrocarbon group, Y is —$R^1$—O—($C_3H_6O$)$_j$—H, $R^1$ is an alkylene group of 1 to 12 carbon atoms, k is an integer of at least 1, m is an integer of at least 1, k+m is an integer of at least 10, n is an integer of at least 4, and j is an integer of at least 5.

Specifically, R is preferably a substituted or unsubstituted monovalent hydrocarbon group of 1 to 10 carbon atoms, more preferably 1 to 8 carbon atoms. examples of which are as exemplified above for $R^2$. $R^1$ is an alkylene group of 1 to 12 carbon atoms, preferably 2 to 4 carbon atoms, for example, methylene, ethylene, trimethylene and tetramethylene. The subscript k is an integer of at least 1, preferably 3 to 100, more preferably 5 to 50; m is an integer of at least 1, preferably 3 to 100, more preferably 5 to 50; k+m is an integer of at least 10, preferably 6 to 200, more preferably 10 to 100; n is an integer of at least 4, preferably 4 to 20, more preferably 4 to 10; and j is an integer of at least 5, preferably 10 to 200, more preferably 20 to 100.

The polyoxypropylene-modified silicone can be obtained through addition reaction of a corresponding siloxane bearing a hydrosilyl group and a polypropylene glycol bearing an alkenyl group at one end and a hydroxyl group at an opposite end, in the presence of a platinum catalyst.

The amount of the polyoxypropylene-modified silicone compounded is 0.1 to 10 parts by weight, preferably 0.2 to 5 parts by weight per 100 parts by weight of component (A). Less than 0.1 pbw of the modified silicone fails to achieve sufficient sag control whereas more than 10 pbw of the modified silicone is economically disadvantageous.

Component C

Component (C) is wet silica which serves as a filler in the RTV organopolysiloxane composition of the invention. Wet silica may be prepared by any known methods. One exemplary method is by using sodium silicate derived from silica sand as raw material, neutralizing an aqueous solution of sodium silicate, allowing silica to precipitate, followed by filtration and drying. Alternatively, an alkoxysilane is used instead of the sodium silicate and subjected to hydrolysis reaction.

The wet silica used herein should preferably have a BET specific surface area of greater than or equal to 50 square meters per gram ($m^2/g$), more preferably greater than or equal to 75 $m^2/g$, and most preferably 100 to 400 $m^2/g$, a ratio of BET specific surface area to CTAB specific surface area of from 1.0 to 1.3, more preferably from 1.0 to 1.2, and most preferably from 1.0 to 1.1, and a water content of less than or equal to 1% by weight, and more preferably less than or equal to 0.5% by weight. Silica with a BET specific surface area of less than 50 $m^2/g$ fails to impart mechanical strength. If the BET/CTAB specific surface area ratio is outside the range of 1.0 to 1.3, or if the water content is more than 1% by weight, the composition will gel during kneading. As used herein, the BET specific surface area is a specific surface area as measured by the BET method in terms of a nitrogen adsorption amount, and the CTAB specific surface area refers to a specific surface area as measured in terms of an adsorption amount of N-cetyl-N,N,N-trimethylammonium bromide. As the BET/CTAB specific surface area ratio is closer to 1, the silica contains less pores in the interior, indicating a structure that adsorbs little water within internal pores. This suggests ease of water removal even when silica's apparent water content is high.

The wet silica which can be used as component (C) is commercially available, for example, as Siloa 72X from Rhodia. The water content may be adjusted to the desired level by previously holding wet silica in a batch dryer vessel, continuous ribbon blender or the like.

An appropriate amount of wet silica (C) compounded is 1 to 50 parts by weight, more preferably 5 to 30 parts by weight, per 100 parts by weight of component (A). Less than 1 pbw of wet silica fails to control sag whereas more than 50 pbw of wet silica leads to a higher viscosity, detracting from workability.

Component D

Component (D) is a silane or siloxane having at least three hydrolyzable groups bonded to silicon atoms in a molecule, which serves as a shelf stabilizer and a crosslinking agent in the RTV organopolysiloxane composition of the invention. The hydrolyzable groups the silane compounds and partial hydrolyzates thereof possess include ketoxime, alkoxy, acetoxy, isopropenoxy and other groups. Specific examples include ketoxime silanes such as tetrakis(methylethylketoxime)silane, methyltris(dimethylketoxime)silane, methyltris(methylethylketoxime)silane, ethyltris(methylethylketoxime)silane, methyltris(methylisobutylketoxime)silane, and vinyltris(methylethylketoxime)silane; alkoxysilanes such as methyltrimethoxysilane, vinyltrimethoxysilane, phenyltrimethoxysilane and vinyltriethoxysilane; acetoxysilanes such as methyltriacetoxysilane and vinyltriacetoxysilane; isopropenoxysilanes such as methyltriisopropenoxysilane, vinyltriisopropenoxysilane and phenyltriisopropenoxysilane, and partial hydrolytic condensates of the foregoing silanes. These silanes may be used alone or in admixture of two or more.

An appropriate amount of component (D) compounded is 1 to 20 parts by weight, more preferably 5 to 15 parts by weight, per 100 parts by weight of component (A). Less than 1 pbw of component (D) is too small to achieve crosslinking, failing to provide a composition having desired rubber elasticity, whereas more than 20 pbw of component (D) is economically disadvantageous.

Component E

Component (E) optionally included in the inventive composition is a cure catalyst that catalyzes the reaction of components (A) and (D) and the cure reaction through hydrolysis of the composition. Suitable cure catalysts include tin ester compounds such as tin dioctoate; alkyltin ester compounds such as dibutyltin diacetate, dibutyltin dilaurate, and dibutyltin dioctoate; titanates and titanium chelates such as tetraisopropoxytitanium, tetra-n-butoxytitanium, tetrakis(2-ethylhexoxy)titanium, dipropoxybis(acetylacetonato)titanium, and titanium isopropoxyoctylene glycol; organometallic compounds such as zinc naphthenate, zinc stearate, zinc 2-ethyloctoate, iron 2-ethylhexoate, cobalt 2-ethylhexoate, manganese 2-ethylhexoate, cobalt naphthenate, and alkoxyaluminum compounds; aminoalkyl-substituted alkoxysilanes such as 3-aminopropyltriethoxysilane and N-(β-aminoethyl)-γ-aminopropyltrimethoxysilane; amine compounds and salts thereof such as hexylamine, dodecylamine phosphate, tetramethylguanidine and diazabicyclononane; quaternary ammonium salts such as benzyltriethylammonium acetate; alkali metal salts of lower fatty acids such as potassium acetate, sodium acetate and lithium oxalate; dialkylhydroxylamines such as dimethylhydroxylamine and diethylhydroxylamine; and guanidyl-containing silanes or siloxanes such as tetramethylguanidylpropyltrimethoxysilane, tetramethylguanidylpropylmethyldimethoxysilane and tetramethylguanidylpropyltris(trimethylsiloxy)silane. Inter alia, the tin ester compounds and alkyltin ester compounds are preferred. These catalysts may be used alone or in admixture of two or more.

The cure catalyst is used in an amount of 0.01 to 10 parts by weight, preferably 0.05 to 5 parts by weight per 100 parts by weight of component (A).

Component F

In the RTV organopolysiloxane composition of the invention, (F) a silane coupling agent may be compounded as an adhesion promoter. Any silane coupling agents known in the art may be used. Preferred are those silane coupling agents having an alkoxysilyl or alkenoxysilyl group as the hydrolyzable group, including vinyltris(β-methoxyethoxy)silane, γ-methacryloxypropyltrimethoxysilane, β-(3,4-epoxycyclohexyl)ethyltrimethoxysilane, γ-glycidoxypropyltrimethoxysilane, γ-glycidoxypropylmethyldiethoxysilane, N-(β-aminoethyl)-γ-aminopropyltrimethoxysilane, γ-aminopropyltriethoxysilane, γ-mercaptopropyltrimethoxysilane, γ-glycidoxypropyltriisopropenoxysilane, and γ-glycidoxypropylmethyldiisopropenoxysilane. Inter alia, amine-based silane coupling agents are desirable.

Typically the silane coupling agent (F) is used in an amount of 0.1 to 20 parts by weight, preferably 0.2 to 10 parts by weight per 100 parts by weight of component (A). On this basis, less than 0.1 pbw of component (F) may fail to promote adhesion whereas more than 10 pbw may be economically disadvantageous.

Additives

Optionally, a variety of well-known additives may be added to the RTV organopolysiloxane composition of the invention insofar as they do not adversely affect the benefits of the invention. Suitable additives include plasticizers such as silicone oil and isoparaffins, colorants such as pigments, dyes and fluorescent brighteners, biologically active agents such as mildew-proof agents, antifungal agents, insect repellents and marine organism repellents, bleed oils such as phenylsilicone oil and fluorosilicone oil, surface modifiers such as silicone-incompatible organic liquids, and solvents such as toluene, xylene, gasoline, cyclohexane, methylcyclohexane, and low-boiling isoparaffins.

The inventive compositions can be used in many applications, typically as silicone-based sealing agents and adhesives such as building sealants, adhesives for electric and electronic uses, sealants for transporting vehicles, and the like. The compositions may be diluted with an appropriate amount of solvent to provide thixotropy so that they are useful as building coating agents, coating agents for marine structures, ship bottom paints, coating agents for outdoor electric structures, and coating agents for electric and electronic parts.

EXAMPLE

Examples and Comparative Examples are given below for further illustrating the invention although the invention is not limited thereto. All parts are by weight. Me is methyl.

Example 1

A composition #1 was prepared by combining 100 parts of a dimethylpolysiloxane bearing hydroxyl groups at both ends and having a viscosity of 50,000 mPa-s, 2 parts of an addition reaction product of 1,3,5,7-tetramethyl-1,3,5,7-tetrahydrotetracyclosiloxane and a polypropylene glycol bearing an allyl group at one end and a hydroxyl group at the other end and having a degree of polymerization of 9, 15 parts of wet silica having a water content of 0.8 wt % (Siloa 72X, Rhodia), 8 parts of vinyltributanoximesilane, 0.15 part of dibutyltin dioctoate, and 1 part of γ-aminopropyltriethoxysilane, and mixing them in a dry atmosphere until uniform.

Example 2

A composition #2 was prepared by the same procedure as in Example 1 except that an addition reaction product of 1,3,5,7-tetramethyl-1,3,5,7-tetrahydrotetracyclosiloxane and a polypropylene glycol bearing an allyl group at one end and a hydroxyl group at the other end and having a degree of polymerization of 23 was used instead of the addition reaction product of 1,3,5,7-tetramethyl-1,3,5,7-tetrahydrotetracyclosiloxane and a polypropylene glycol bearing an allyl group at one end and a hydroxyl group at the other end and having a degree of polymerization of 9.

Example 3

A composition #3 was prepared by the same procedure as in Example 1 except that wet silica having a water content of 0.5 wt % (Finesil E70, Tokuyama Corp.) was used instead of the wet silica having a water content of 0.8 wt % (Siloa 72X, Rhodia).

Comparative Example 1

A composition #4 was prepared by the same procedure as in Example 1 except that a polypropylene glycol bearing an allyl group at one end and a hydroxyl group at the other end and having a degree of polymerization of 9 was used instead of the addition reaction product of 1,3,5,7-tetramethyl-1,3,5,7-tetrahydrotetracyclosiloxane and a polypropylene glycol bearing an allyl group at one end and a hydroxyl group at the other end and having a degree of polymerization of 9.

Comparative Example 2

A composition #5 was prepared by the same procedure as in Example 1 except that a polypropylene glycol bearing an allyl group at one end and a hydroxyl group at the other end and having a degree of polymerization of 23 was used instead of the addition reaction product of 1,3,5,7-tetramethyl-1,3,5,7-tetrahydrotetracyclosiloxane and a polypropylene glycol bearing an allyl group at one end and a hydroxyl group at the other end and having a degree of polymerization of 9.

The compositions of Examples 1-3 and Comparative Examples 1-2 were measured for slump according to JIS A-5758. Separately, the compositions were formed into sheets of 2 mm thick and cured in an atmosphere of 23±2° C. and 50±5% RH for 7 days before they were determined for rubber physical properties (hardness, elongation at break and tensile strength). The results are shown in Table 1.

TABLE 1

|  | Example | | | Comparative Example | |
|---|---|---|---|---|---|
|  | 1 | 2 | 3 | 1 | 2 |
| Composition | #1 | #2 | #3 | #4 | #5 |
| Slump, mm | 0 | 0 | 4 | slumped | slumped |
| Hardness, Durometer A | 35 | 35 | 30 | 30 | 32 |
| Elongation, % | 550 | 550 | 450 | 500 | 500 |
| Tensile strength, MPa | 2.2 | 2.4 | 2.2 | 2.0 | 1.9 |

Example 4

A composition #6 was prepared by combining 100 parts of a dimethylpolysiloxane bearing hydroxyl groups at both ends and having a viscosity of 50,000 mPa-s, 2 parts of an addition reaction product of a siloxane having the average formula: $(Me_3SiO_{1/2})_2(Me_2SiO)_{18}(HMeSiO)_{20}$ and a polypropylene glycol bearing an allyl group at one end and a hydroxyl group at the other end and having a degree of polymerization of 9, 20 parts of wet silica having a water content of 0.5 wt % (Siloa 72X, Rhodia), 25 parts of a dimethylpolysiloxane bearing trimethylsiloxy groups at both ends and having a viscosity of 100 mPa-s, 8 parts of methyltributanoximesilane, 0.15 part of dioctyltin dilaurate, and 0.8 part of γ-ethylenediaminopropyltrimethoxysilane, and mixing them in a dry atmosphere until uniform.

Example 5

A composition #7 was prepared by the same procedure as in Example 4 except that an addition reaction product of a siloxane having the average formula: $(Me_3SiO_{1/2})_2(Me_2SiO)_{31}(HMeSiO)_7$ and a polypropylene glycol bearing an allyl group at one end and a hydroxyl group at the other end and having a degree of polymerization of 23 was used instead of the addition reaction product of a siloxane having the average formula: $(Me_3SiO_{1/2})_2(Me_2SiO)_{18}(HMeSiO)_{20}$ and a polypropylene glycol bearing an allyl group at one end and a hydroxyl group at the other end and having a degree of polymerization of 9.

Example 6

A composition #8 was prepared by the same procedure as in Example 4 except that an addition reaction product of a siloxane having the average formula: $(HMe_2SiO_{1/2})_2(Me_2SiO)_{18}$ and a polypropylene glycol bearing an allyl group at one end and a hydroxyl group at the other end and having a degree of polymerization of 23 was used instead of the addition reaction product of a siloxane having the average formula: $(Me_3SiO_{1/2})_2(Me_2SiO)_{18}(HMeSiO)_{20}$ and a polypropylene glycol bearing an allyl group at one end and a hydroxyl group at the other end and having a degree of polymerization of 9.

Comparative Example 3

A composition #9 was prepared by the same procedure as in Example 4 except that a polypropylene glycol bearing an allyl group at one end and a hydroxyl group at the other end and having a degree of polymerization of 23 was used instead of the addition reaction product of a siloxane having the average formula: $(Me_3SiO_{1/2})_2(Me_2SiO)_{18}(HMeSiO)_{20}$ and a polypropylene glycol bearing an allyl group at one end and a hydroxyl group at the other end and having a degree of polymerization of 9.

Comparative Example 4

A composition #10 was prepared by the same procedure as in Example 4 except that dry silica having a water content of 0.5 wt % (Aerosil R972, Nippon Aerosil Co., Ltd.) was used instead of the wet silica having a water content of 0.5 wt % (Siloa 72X, Rhodia).

The compositions of Examples 4-6 and Comparative Examples 3-4 were measured for slump according to JIS A-5758. Separately, the compositions were formed into sheets of 2 mm thick and cured in an atmosphere of 23±2° C. and 50±5% RH for 7 days before they were determined for rubber physical properties. The results are shown in Table 2. For Compositions #6 and #10, H-shaped blocks of alumite were formed according to JIS A-1439 and a 9030 fatigue endurance test was performed according to JIS A-5758. The results are also shown in Table 2.

TABLE 2

|  | Example | | | Comparative Example | |
|---|---|---|---|---|---|
|  | 4 | 5 | 6 | 3 | 4 |
| Composition | #6 | #7 | #8 | #9 | #10 |
| Slump, mm | 0 | 0 | 0 | slumped | 0 |
| Hardness, Durometer A | 20 | 22 | 20 | 20 | 22 |
| Elongation, % | 770 | 750 | 720 | 700 | 550 |
| Tensile strength, MPa | 2.0 | 1.9 | 1.8 | 1.7 | 1.3 |
| 9030 fatigue endurance test | passed | — | — | — | rejected |

Example 7

A composition #11 was prepared by combining 100 parts of a dimethylpolysiloxane bearing hydroxyl groups at both ends and having a viscosity of 20,000 mPa-s, 2 parts of an addition reaction product of a siloxane having the average formula: $(Me_3SiO_{1/2})_2(Me_2SiO)_{18}(HMeSiO)_{20}$ and a polypropylene glycol bearing an allyl group at one end and a hydroxyl group at the other end and having a degree of polymerization of 9, 20 parts of wet silica having a water content of 0.5 wt % (Siloa 72X, Rhodia), 5 parts of vinyltrimethoxysilane, and 3 parts of dipropoxybis(acetylacetonato)titanium, and mixing them in a dry atmosphere until uniform.

Example 8

A composition #12 was prepared by combining 100 parts of a dimethylpolysiloxane bearing hydroxyl groups at both ends and having a viscosity of 20,000 mPa-s, 2 parts of an addition reaction product of a siloxane having the average formula: $(Me_3SiO_{1/2})_2(Me_2SiO)_{18}(HMeSiO)_{20}$ and a polypropylene glycol bearing an allyl group at one end and a hydroxyl group at the other end and having a degree of polymerization of 9, 20 parts of wet silica having a water content of 0.5 wt % (Siloa 72X, Rhodia), 5 parts of vinyltriisopropenoxysilane, and 1 part of tetramethylguanidylpropyltrimethoxysilane, and mixing them in a dry atmosphere until uniform.

Example 9

A composition #13 was prepared by combining 100 parts of a dimethylpolysiloxane bearing a trimethoxysilyl group bonded via an oxygen atom at each end and having a viscosity of 20,000 mPa-s, 2 parts of an addition reaction product of a siloxane having the average formula: $(Me_3SiO_{1/2})_2(Me_2SiO)_{18}(HMeSiO)_{20}$ and a polypropylene glycol bearing an allyl group at one end and a hydroxyl group at the other end and having a degree of polymerization of 9, 23 parts of wet silica having a water content of 0.5 wt % (Siloa 72X, Rhodia), 25 parts of a dimethylpolysiloxane bearing trimethylsilyl groups at both ends and having a viscosity of 100 mPa-s, 5 parts of methyltrimethoxysilane, and 4 parts of dipropoxybis(acetylacetonato)titanium, and mixing them in a dry atmosphere until uniform.

Example 10

A composition #13 was prepared by combining 100 parts of a dimethylpolysiloxane bearing a trimethoxysilyl group bonded via an ethylene group at each end and having a viscosity of 30,000 mPa-s, 2 parts of an addition reaction product of a siloxane having the average formula: $(Me_3SiO_{1/2})_2(Me_2SiO)_{18}(HMeSiO)_{20}$ and a polypropylene glycol bearing an allyl group at one end and a hydroxyl group at the other end and having a degree of polymerization of 9, 23 parts of wet silica having a water content of 0.5 wt % (Siloa 72X, Rhodia), 8 parts of a dimethylpolysiloxane bearing trimethylsilyl groups at both ends and having a viscosity of 100 mPa-s, 5 parts of vinyltrimethoxysilane, and 1.5 parts of tetrapropoxytitanium, and mixing them in a dry atmosphere until uniform.

The compositions of Examples 7-10 were measured for slump according to JIS A-5758. Separately, the compositions were formed into sheets of 2 mm thick and cured in an atmosphere of 23±2° C. and 50±5% RH for 7 days before they were determined for rubber physical properties. The results are shown in Table 3.

TABLE 3

|  | Example | | | |
|---|---|---|---|---|
|  | 7 | 8 | 9 | 10 |
| Composition | #11 | #12 | #13 | #14 |
| Slump, mm | 0 | 0 | 0 | 0 |
| Hardness, Durometer A | 37 | 40 | 35 | 41 |
| Elongation, % | 400 | 380 | 390 | 310 |
| Tensile strength, MPa | 3.3 | 3.0 | 3.0 | 3.3 |

Japanese Patent Application No. 2005-141156 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A room temperature-curable organopolysiloxane composition comprising (A) 100 parts by weight of a diorganopolysiloxane having hydroxyl groups at both ends and/or a diorganopolysiloxane having alkoxysilyl groups at both ends, (B) 0.1 to 10 parts by weight of a polyoxypropylene-modified silicone having the general formula (1), (2) or (3):

$$R_3SiO\text{—}(SiO)_k\text{—}(SiO)_m\text{—}SiR_3 \tag{1}$$

with R on each Si and Y on the middle Si,

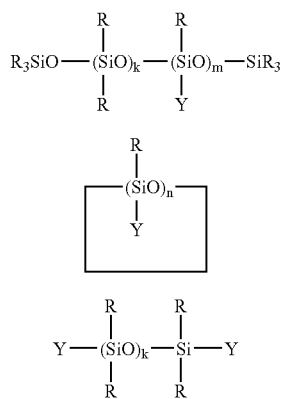

$$Y\text{—}(SiO)_k\text{—}Si\text{—}Y \tag{3}$$

with R groups, wherein R is each independently a substituted or unsubstituted monovalent hydrocarbon group, Y is —$R^1$—O—$(C_3H_6O)_j$—H, $R^1$ is an alkylene group of 1 to 12 carbon atoms, k is an integer of at least 1, m is an integer of at least 1, k+m is an integer of at least 10, n is an integer of at least 4, and j is an integer of at least 5, (C) 1 to 50 parts by weight of wet silica having a water content of up to 1% by weight and prepared by using sodium silicate derived from silica sand as raw material, neutralizing an aqueous solution of sodium silicate, allowing silica to precipitate, followed by filtration and drying, or subjecting an alkoxysilane to hydrolysis reaction, said wet silica having a BET specific surface area of greater than or equal to 50 square meters per gram (m²/g), and (D) 1 to 20 parts by weight of a silane or siloxane having at least three hydrolyzable groups bonded to silicon atoms in a molecule.

2. The composition of claim 1, further comprising (B) 0.01 to 10 parts by weight of a cure catalyst.

3. The composition of claim 1, further comprising (F) 0.1 to 20 parts by weight of a silane coupling agent.

4. The composition of claim 1 which is used as a sealing agent or adhesive.

5. The composition of claim 1, wherein component A) is a diorganopolysiloxanes having the general formulae (4) or (5):

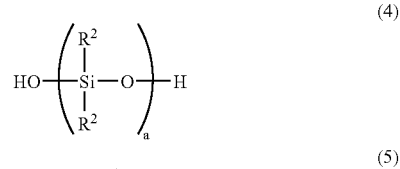

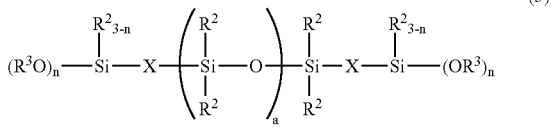

wherein $R^2$, which may be the same or different, is a substituted or unsubstituted monovalent hydrocarbon group of 1 to 10 carbon atoms, $R^3$, which may be the same or different, is a substituted or unsubstituted monovalent hydrocarbon group of 1 to 6 carbon atoms, X is an oxygen atom or a substituted or unsubstituted divalent hydrocarbon group of 2 to 6 carbon atoms, a is an integer of at least 10, and n is an integer of 1 to 3.

6. The composition of claim 1, wherein component A) has a viscosity of 100 to 1,000,000 mPa·s at 20° C.

7. The composition of claim 1, wherein component C) has a ratio of BET specific surface area to CTAB specific surface area of from 1.0 to 1.3.

8. The composition of claim 1, wherein the hydrolyzable group of component D) is selected from the group consisting of ketoxime, alkoxy, acetoxy, isopropenoxy and combinations thereof.

9. The composition of claim 1, wherein component D) is a ketoxime silane, an alkoxysilane, an acetoxysilane, an isopropenoxysilane, a partial hydrolytic condensates of a ketoxime silane, partial hydrolytic condensates of an alkoxysilane, partial hydrolytic condensates of an acetoxysilane, partial hydrolytic condensates of an isopropenoxysilane or mixtures thereof.

10. The composition of claim 1, comprising a solvent in an amount so that the composition is thixotropic.

* * * * *